United States Patent
Sato et al.

(10) Patent No.: US 10,775,166 B2
(45) Date of Patent: Sep. 15, 2020

(54) SHAPE EVALUATION METHOD AND SHAPE EVALUATION APPARATUS

(71) Applicants: NATIONAL UNIVERSITY CORPORATION KOBE UNIVERSITY, Kobe-shi, Hyogo (JP); MAKINO MILLING MACHINE CO., LTD., Tokyo (JP)

(72) Inventors: Ryuta Sato, Hyogo (JP); Yuki Sato, Hyogo (JP); Mitsunari Oda, Kanagawa (JP); Nobu Nakayama, Kanagawa (JP)

(73) Assignees: NATIONAL UNIVERSITY CORPORATION KOBE UNIVERSITY, Kobe-shi, Hyogo (JP); MAKINO MILLING MACHINE CO., LTD., Tokyo (JP)

( * ) Notice: Subject to any disclaimer, the term of this patent is extended or adjusted under 35 U.S.C. 154(b) by 638 days.

(21) Appl. No.: 15/543,181

(22) PCT Filed: Feb. 2, 2016

(86) PCT No.: PCT/JP2016/053074
§ 371 (c)(1),
(2) Date: Jul. 12, 2017

(87) PCT Pub. No.: WO2016/125797
PCT Pub. Date: Aug. 11, 2016

(65) Prior Publication Data
US 2017/0370714 A1 Dec. 28, 2017

(30) Foreign Application Priority Data
Feb. 5, 2015 (JP) .............................. 2015-021309

(51) Int. Cl.
*G01B 3/22* (2006.01)
*G01B 21/30* (2006.01)
(Continued)

(52) U.S. Cl.
CPC .......... *G01B 21/30* (2013.01); *G01B 21/042* (2013.01); *G01B 21/20* (2013.01); *G01N 21/88* (2013.01);
(Continued)

(58) Field of Classification Search
CPC ...... G01B 21/30; G01B 21/042; G01B 21/20; G01N 21/88; G05B 19/41875;
(Continued)

(56) References Cited

U.S. PATENT DOCUMENTS 5,627,771 A  5/1997  Makino
6,683,985 B1 * 1/2004  Kase ..................... G01B 21/20
                                                              382/141

(Continued)

FOREIGN PATENT DOCUMENTS

JP   8-159740     6/1996
JP   H10-096696   4/1998

(Continued)

OTHER PUBLICATIONS

International Search Report dated Apr. 26, 2016, directed to PCT Application No. PCT/JP2016/053074; 3 pages.

*Primary Examiner* — Toan M Le
*Assistant Examiner* — Xiuqin Sun
(74) *Attorney, Agent, or Firm* — Morrison & Foerster LLP

(57) ABSTRACT

A shape evaluation method includes a shape error calculation step that calculates a shape error, which is an error between a designed shape and a shape to be evaluated, and a visible error detection step that detects visible shape errors on the basis of the shape error and predetermined visual characteristic data.

4 Claims, 9 Drawing Sheets

(51) Int. Cl.
*G01N 21/88* (2006.01)
*G01B 21/20* (2006.01)
*G01B 21/04* (2006.01)
*G06T 7/00* (2017.01)
*G05B 19/418* (2006.01)

(52) U.S. Cl.
CPC ........ *G05B 19/41875* (2013.01); *G06T 7/001* (2013.01); *G06T 7/0004* (2013.01); *G05B 2219/32186* (2013.01); *G06T 2207/30164* (2013.01); *Y02P 90/22* (2015.11); *Y02P 90/265* (2015.11)

(58) Field of Classification Search
CPC ........ G05B 2219/32186; G06T 7/0004; G06T 7/001; G06T 2207/30164; Y02P 90/22; Y02P 90/265
USPC ........................................................ 702/167
See application file for complete search history.

(56) References Cited

U.S. PATENT DOCUMENTS

| 8,121,247 | B2* | 2/2012 | Kunzmann | G01N 23/046 |
| | | | | 378/19 |
| 2009/0136121 | A1* | 5/2009 | Nakagaki | G06T 7/0006 |
| | | | | 382/149 |
| 2011/0320023 | A1 | 12/2011 | Sullivan et al. | |

FOREIGN PATENT DOCUMENTS

| JP | 2006-258503 | 9/2006 |
| JP | 2008-241407 | 10/2008 |
| JP | 2011-127936 | 6/2011 |
| JP | 2011-185659 | 9/2011 |
| JP | 2013-29350 | 2/2013 |

* cited by examiner

SHAPE EVALUATION METHOD AND SHAPE EVALUATION APPARATUS

CROSS-REFERENCE TO RELATED APPLICATIONS

This application is a U.S. National Stage Application of International Patent Application No. PCT/JP2016/053074, filed on Feb. 2, 2016, which claims priority to Japanese Application No. 2015-021309, filed on Feb. 5, 2015, which are hereby incorporated by reference in the present disclosure in its entirety.

FIELD OF THE INVENTION

The present invention relates to a shape evaluation method and a shape evaluation device of a target object.

BACKGROUND OF THE INVENTION

The quality of the surface of the workpiece is evaluated in a workpiece machined by a machine tool or the like. The quality of the surface affects not only the aesthetic appearance of the surface as seen by a person but also the design as seen by a person. For example, when the quality of the surface is poor, lines and patterns may be visible in undesired areas. In particular, when the object to be evaluated is a mold, the shape of the surface of the mold is transferred to many products manufactured. The shape of the surface of the mold is important, and it is preferable to increase the quality as seen by a person. The quality of such a surface can be evaluated by measuring the surface roughness or the like with a measuring instrument.

As a method for evaluating the quality of a surface, a method for evaluating the quality of the surface based on an image obtained by photographing the surface of the object is known. For example, there is known a method including photographing the surface of an object to generate image data, performing frequency analysis of a change in the brightness obtained from the image data, and performing evaluation based on a frequency component that can be visually recognized by a person (see Patent Literature 1 and Patent literature 2).

CITATIONS LIST

Patent Literature

[Patent literature 1] Japanese Unexamined Patent Publication No. H10-96696
[Patent literature 2] Japanese Unexamined Patent Publication No. 2011-185659

BRIEF SUMMARY OF THE INVENTION

In machining with a machine tool or the like, the surface may appear to be rough as seen by a person, although it is within the allowable range in the evaluation of the surface roughness or the like. Alternatively, unwanted polygonal lines or the like may appear in the processed workpiece, which may be greatly different from the desired design. On the contrary, although the surface roughness evaluation is out of the allowable range, the surface may look beautiful to the eyes of the person who sees the surface. Such quality as seen by a person is referred to as a surface quality. Evaluation of the surface quality may not match the evaluation of the surface roughness or the like of the conventional determination method.

According to the method described in Japanese Unexamined Patent Publication No. H10-96696 or the like, an actual product is photographed in order to obtain image data. Therefore, there is a problem that it may not be determined whether or not a visual problem occurs until a product to be evaluated is actually manufactured. In addition, the state of light at the time of photographing and the characteristics of the camera used for photographing affect the result of the evaluation of the surface, so that the evaluation result may not match with the visual evaluation made by a person when the person actually sees the product.

In particular, there is a problem that it may not be determined whether the shape is intentionally changed at the time of designing the product or the shape is changed due to error in the manufacturing process. For example, there is a problem that whether the shape is a corner portion (character line) intentionally formed by the design when the corner portion is formed in the product or whether the shape is a corner portion generated due to error in the manufacturing process may not be determined.

It is an object of the present invention to provide a shape evaluation method and a shape evaluation device capable of evaluating the quality of a surface of an object visually felt by a person.

A shape evaluation method according to the present invention is a shape evaluation method for evaluating a shape on a surface of the target object, including a step of storing design data having a design shape configured during designing of a target object, a step of storing evaluation target data having an evaluation target shape which is a target of evaluation of the target object, a shape error calculation step of calculating a shape error on the basis of the design shape and the evaluation target shape, a visible error detection step of detecting a visible shape error from the calculated shape error on the basis of the shape error calculated in the shape error calculation step and visual characteristic data defined in advance, and a step of identifying a position where a visible shape error occurs.

In the above invention, the shape error calculation step may include a step of calculating an error in a normal direction change rate serving as the shape error by subtracting the normal direction change rate of the design shape from the normal direction change rate of the evaluation target shape.

In the above invention, the visual characteristic data may include first visual characteristic data relating to a spatial frequency and second visual characteristic data relating to a magnitude of the error in a normal direction change rate, and the visible error detection step may include a step of removing a component of the spatial frequency that may not be seen from the error in the normal direction change rate on the basis of the first visual characteristic data, and a step of determining whether or not there is any error in the normal direction change rate that can be seen on the basis of the second visual characteristic data.

In the above invention, the first visual characteristic data may include a determination value of the spatial frequency that is set on the basis of a border where a change in a shape can be recognized when a person sees the first test object having the shape of which visual resolution is to be evaluated on the surface thereof, and the second visual characteristic data may include a determination value of the error in the normal direction change rate that is set on the basis of a border where a change in a shape can be recognized when a person sees the second test object having the shape of which visibility limitation of the normal direction change rate is to be evaluated on the surface thereof.

In the above invention, the first test object may have the shape of the surface having protrusions and recesses in a form of streaks of which interval gradually decreases, and the second test object may have a ridgeline of which normal direction changes on the surface thereof, and have such the shape that the normal direction change rate continuously changes at the ridgeline along a direction in which the ridgeline extends.

A shape evaluation device according to the present invention is the shape evaluation device evaluating a shape on a surface of a target object, and the shape evaluation device includes a design data storage part storing design data having a design shape configured during designing of the target object, an evaluation target data storage part storing evaluation target data having an evaluation target shape which is a target of evaluation of the target object, a shape error calculation part calculating a shape error on the basis of the design shape and the evaluation target shape, a visible error detection part detecting a visible shape error from the calculated shape error on the basis of the shape error calculated by the shape error calculation part and visual characteristic data defined in advance, and a position identifying part identifying a position where the visible shape error occurs.

In the above invention, the visual characteristic data may include first visual characteristic data relating to a spatial frequency and second visual characteristic data relating to a magnitude of a shape error, the shape error calculation part may be formed to calculate an error in a change rate of the shape, and the visible error detection part may include a spatial frequency processing part removing a component of the spatial frequency that may not be seen from the error in the change rate of the shape on the basis of the first visual characteristic data and an error determination part determining whether or not there is any error in the change rate of the shape that can be seen on the basis of the second visual characteristic data.

According to the present invention, a shape evaluation method and a shape evaluation device capable of evaluating the quality of a surface of an object visually felt by a person can be provided.

DETAILED DESCRIPTION OF THE INVENTION

Figure 1:
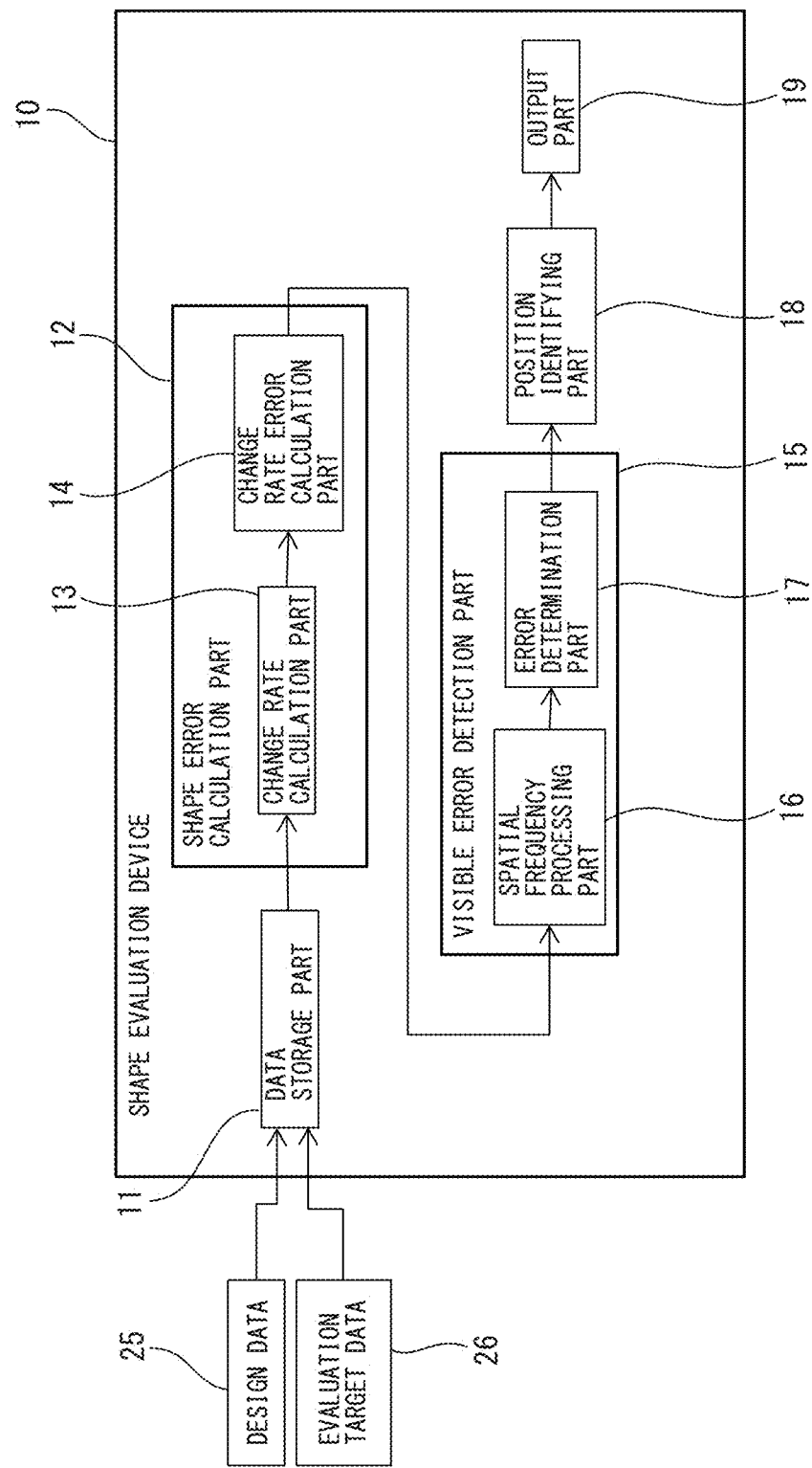
FIG. 1 is a block diagram of a shape evaluation device according to an embodiment.

A shape evaluation method and a shape evaluation device according to an embodiment will be explained with reference to FIG. 1 to FIG. 14. FIG. 1 shows a block diagram of a shape evaluation device according to the present embodiment. In the present embodiment, an object to be evaluated is referred to as a target object. The shape evaluation device compares the shape of a processed target object with the shape of a target object in design.

The shape evaluation device 10 is a device that evaluates the shape of the surface of the target object. Examples of target objects to be evaluated include industrial products such as molds, mechanical parts, automobile bodies, or articles which need design. The shape evaluation device 10 is constituted by, for example, an arithmetic processing device including a CPU (Central Processing Unit), a RAM (Random Access Memory), and ROM (Read Only Memory) and the like connected to each other via a bus.

The shape evaluation device 10 according to the present embodiment receives design data 25 and evaluation target data 26. The shape of the target object to be processed is determined with a CAD (Computer Aided Design) device and the like. A design shape which is a shape of a target object in design is defined in the design data 25.

An evaluation target shape which is a shape of the target to be evaluated is defined in the evaluation target data 26. The shape data of the processed target object can be employed as the evaluation target data 26. For example, virtual shape data obtained by simulation simulating the processing procedure can be used as the evaluation target data 26. Alternatively, the evaluation target data 26 may be shape data in which the shape of the surface obtained by actually processing the target object is set.

The design data 25 and the evaluation target data 26 can include a two-dimensional coordinate value relating to the shape of the surface or a three-dimensional coordinate value relating to the shape of the surface. Alternatively, the design data 25 and the evaluation target data 26 may include information about a normal vector relating to a shape of a surface or information about a normal direction change rate. In the present embodiment, coordinate data including two-dimensional coordinate values will be used and explained as an example of the design data 25 and the evaluation target data 26.

The shape evaluation device 10 includes a data storage part 11 that stores the design data 25 and the evaluation target data 26. The data storage part 11 functions as a design data storage part for storing the design data 25. The data storage part 11 functions as an evaluation target data storage part for storing evaluation target data 26.

The shape evaluation device 10 includes a shape error calculation part 12. The shape error calculation part 12 calculates the error in the shape defined in the evaluation target data 26 with respect to the shape defined in the design data 25. More specifically, the shape error calculation part 12 calculates a shape error which is an error between the design shape and the evaluation target shape.

The shape evaluation device 10 includes a visible error detection part 15. The shape error calculated by shape error calculation part 12 is input to the visible error detection part 15. The visible error detection part 15 detects a shape error that can be discriminated by a person, on the basis of the shape error calculated by the shape error calculation part 12 and visual characteristic data determined in advance. When the shape error is large, the observer can identify that the evaluation target shape is different from the design shape. However, when the shape error is small, the observer may not identify the difference. The visible error detection part 15 detects a shape error that affects vision from the shape error calculated by the shape error calculation part 12.

The shape evaluation device 10 includes a position identifying part 18. Information about the visible shape error that is detected by the visible error detection part 15 is inputted to the position identifying part 18. The position identifying part 18 identifies the position where the visible shape error occurs in the target object.

The shape evaluation device 10 includes an output part 19. A device configured to convey an evaluation result to a worker may be employed as the output part 19. The output part 19 according to the present embodiment is a display part for displaying an evaluation result of a shape. When a visible shape error exists, the display part can display the position where the shape error in the target object exists. Alternatively, the output part 19 may be formed to send the evaluation result to another device.

Figure 2:
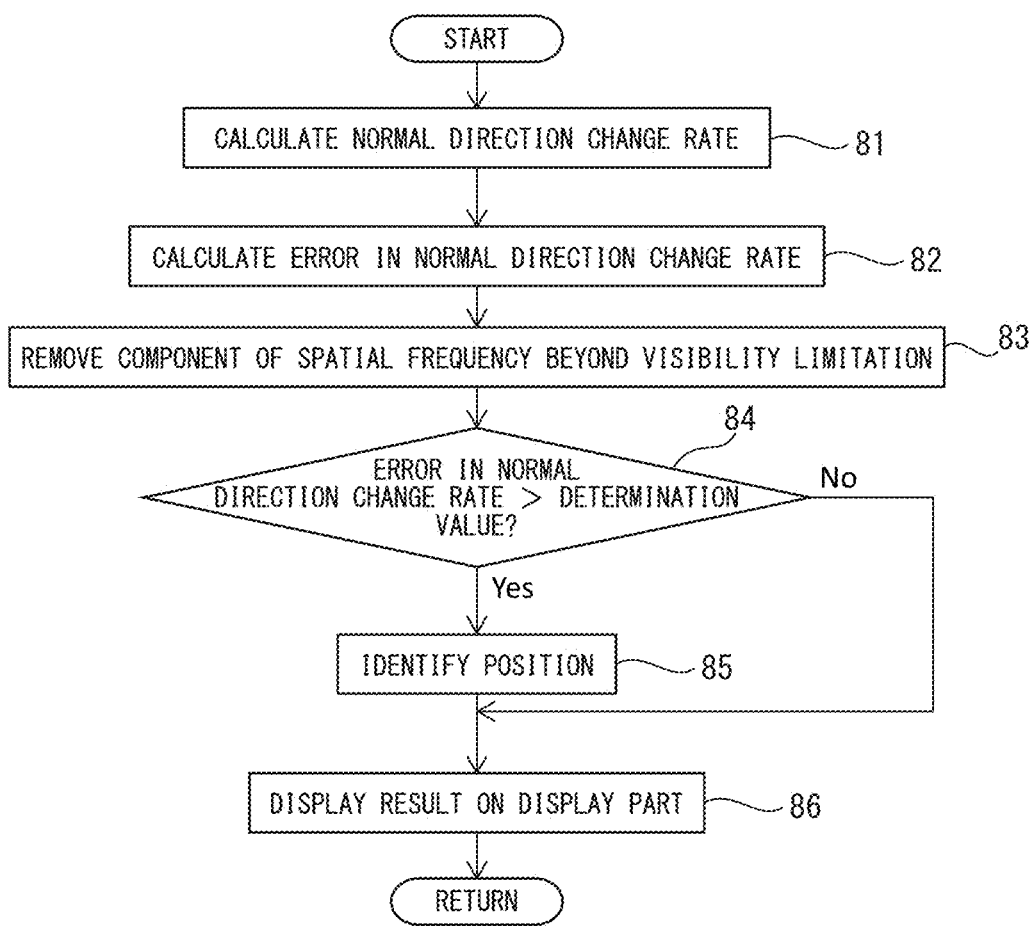
FIG. 2 is a flowchart of a shape evaluation method according to the embodiment.

FIG. 2 shows a flowchart of a shape evaluation method according to the present embodiment. The control illustrated in FIG. 2 is performed by the shape evaluation device 10. In this case, with reference to FIG. 1 and FIG. 2, the error in the normal direction change rate is calculated as a shape error. When the error in the normal direction change rate is large, a person recognizes that the evaluation target shape is visually different from design shape. The error in the normal direction change rate preferably corresponds to the effect visually given when the observer sees the target object.

The shape error calculation part 12 performs a shape error calculation step for calculating a shape error which is an error between the design shape and the evaluation target shape. The shape error calculation part 12 includes a change rate calculation part 13 and a change rate error calculation part 14.

In step 81, the change rate calculation part 13 calculates the normal direction change rate at a certain point on the surface of the target object in each of the design shape and the evaluation target shape. In step 82, the change rate error calculation part 14 calculates the error in the evaluation target shape with respect to the design shape on the basis of the normal direction change rate calculated by the change rate calculation part 13.

Figure 3:
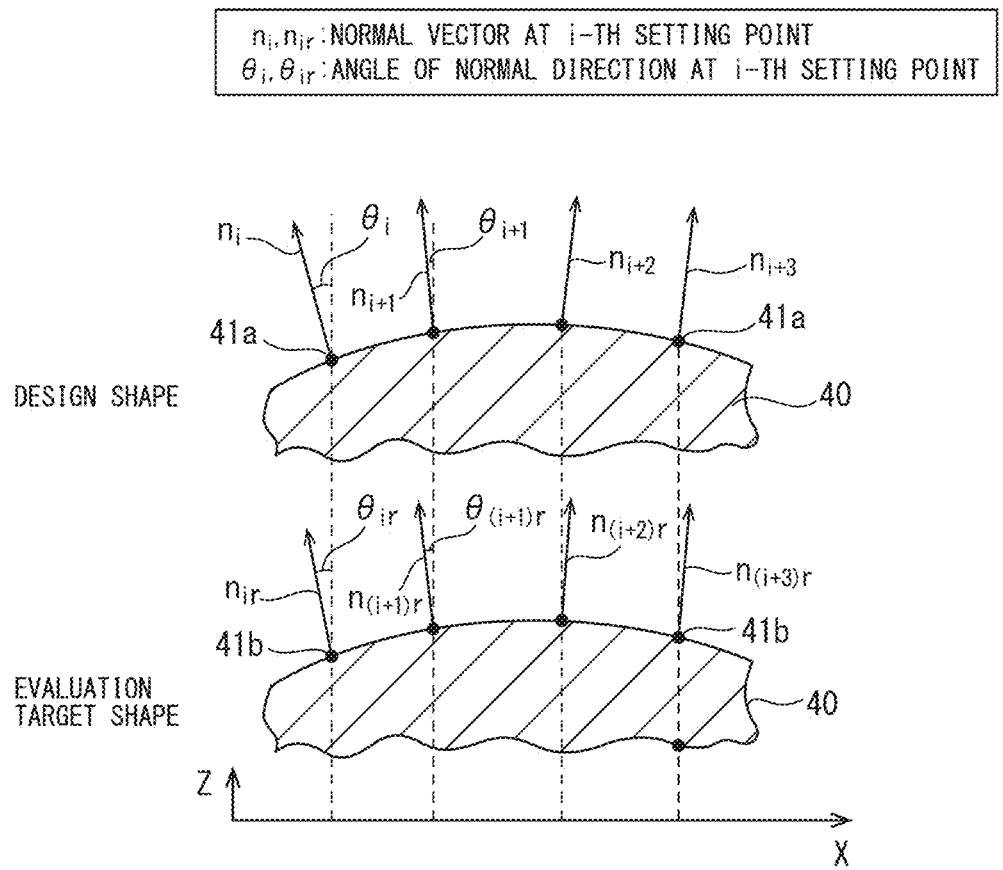
FIG. 3 is a schematic cross-sectional view illustrating a design shape and an evaluation target shape for which evaluation is made according to the embodiment.

FIG. 3 shows a schematic cross-sectional view for explaining the normal direction change rate in each of the design shape and the evaluation target shape. In the present embodiment, the design data 25 and the evaluation target data 26 include two-dimensional coordinate values. In the example as illustrated in FIG. 3, the target object 40 is sectioned in a plane parallel to the X axis and the Z axis. A normal vector can be set with predetermined interval on the surface of the target object 40. The target object 40 is sectioned with every predetermined distance in a plane parallel to the X axis and the Z axis. The normal vectors are set with predetermined interval in each section plane so that the entire surface of the target object can be evaluated.

On the surface of the target object 40 of the design shape, a setting point 41a is set with interval defined in advance. On the surface of the target object 40 of the evaluation target shape, a setting point 41b is set with interval defined in advance. The positions of the setting points 41b respectively correspond to the positions of the setting points 41a.

A normal vector $n_i$ perpendicular to the inclination of the surface is set at the setting point 41a of the design shape. The normal vector $n_i$ is a normal vector of the i-th setting point 41a. An angle $\theta_i$ of the normal direction can be set for the normal vector $n_i$. In this case, the angle with respect to the Z axis is set as the angle $\theta_i$ of the normal direction. A normal vector $n_{ir}$ perpendicular to the inclination of the surface is set at the setting point 41b of the evaluation target shape. An angle $\theta_{ir}$ of the normal direction can also be set for the normal vector $n_{ir}$. In this case, the angle with respect to the Z axis is set as the angle $\theta_{ir}$ of the normal direction.

Figure 4:
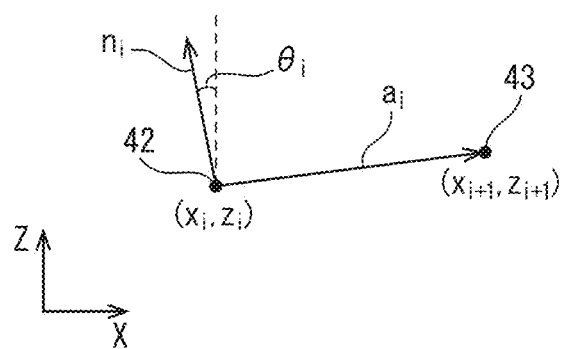
FIG. 4 is an explanatory diagram illustrating a method for obtaining the angle in a normal direction from coordinate information.

FIG. 4 shows a schematic view illustrating a method for calculating an angle of the normal direction from coordinate data. A design shape is illustrated as an example on FIG. 4. The design shape according to the present embodiment is set by coordinate values. The coordinate values of the i-th setting point 42 and the (i+1)-th setting point 43 are already known. A vector $a_i$ can be set on the basis of the coordinate values of these two setting points 42, 43. The vector $a_i$ is a vector from the setting point 42 to the setting point 43. A vector perpendicular to the vector $a_i$ can be set as the normal vector $n_1$. The angle $\theta_i$ of the normal direction at this occasion can be calculated by the following equation (1).

[Formula 1]

$$\theta_i = \tan^{-1} \frac{(z_{i+1} - z_i)}{(x_{i+1} - x_i)} \tag{1}$$

$\theta_i$: angle of normal direction at the i-th setting point

As described above, the angle $\theta_i$ of the normal direction can be calculated for the i-th setting point of the design shape. According to similar method, the angle $\theta_{ir}$ of the normal direction can be calculated for the i-th setting point 41b of the evaluation target shape.

With reference to FIG. 1 and FIG. 2, the change rate calculation part 13 calculates the normal direction change rates at the setting points 41a, 41b. The normal direction change rate is a change rate of angle of the normal direction between two setting points adjacent to each other. For example, the normal direction change rate is a change rate between the angle $\theta_i$ of the normal direction and the angle $\theta_{i+1}$ of the normal direction. The normal direction change rate can be calculated by the following equation (2). The following equation (2) represents the normal direction change rate at the i-th setting point 41a of the design shape. The normal direction change rate of evaluation target shape can also be calculated according to a similar method.

[Formula 2]

$$\frac{d\theta_i}{dx} = \left(\frac{\theta_{(i+1)} - \theta_i}{x_{(i+1)} - x_i}\right) \quad (2)$$

$\frac{d\theta_i}{dx}$: normal direction change rate

Subsequently, in step 82, the change rate error calculation part 14 calculates the error in the normal direction change rate on the basis of the normal direction change rate of the design shape thus calculated and the normal direction change rate of the evaluation target shape. The error in the normal direction change rate can be calculated by subtracting the normal direction change rate of the design shape from the normal direction change rate of the evaluation target shape. The error in the normal direction change rate serving as the shape error can be calculated by the following equation (3).

[Formula 3]

$$E_i = \left(\frac{\theta_{(i+1)r} - \theta_{ir}}{x_{(i+1)r} - x_{ir}}\right) - \left(\frac{\theta_{(i+1)} - \theta_i}{x_{(i+1)} - x_i}\right) \quad (3)$$

$\theta_i$: angle of normal direction at the i-th setting point in design shape $\theta_{ir}$: angle of normal direction at the i-th setting point in evaluation target shape $E_i$: error in normal direction change rate $x_i$: coordinate value at the i-th setting point in design shape $x_{ir}$: coordinate value at the i-th setting point in evaluation target shape Subsequently, the visible error detection part 15 performs a visible error detection step for detecting a visible shape error from the calculated shape error. The visible error detection part 15 detects an error visible by a person on the basis of the shape error calculated in the shape error calculation step and visual characteristic data defined in advance. The visible error detection part 15 includes a spatial frequency processing part 16 and an error determination part 17. The visual characteristic data includes first visual characteristic data on a spatial frequency and second visual characteristic data on the magnitude of an error in normal direction change rate.

In step 83, the spatial frequency processing part 16 performs a step for removing a component of the spatial frequency that may not be recognized from the error in the normal direction change rate. When protrusions and recesses on the surface are finer, a person may not recognize the protrusions and recesses. In other words, when a spatial frequency of protrusions and recesses is high, a person may not distinguish protrusions and recesses appearing on the surface. Similarly, when the spatial frequency of a shape error increases, a person may not distinguish the difference in the evaluation target shape with respect to the design shape. The spatial frequency processing part 16 removes high spatial frequency components exceeding such visibility limitation.

In the step of conducting the processing of the spatial frequency, the first visual characteristic data is used. In the present embodiment, the first visual characteristic data is defined in advance by experiment. Hereinafter, the first visual characteristic data will be explained. First test object having a shape of which visual resolution is evaluated on its surface is used for setting of the first visual characteristic data. The first visual characteristic data includes a determination value of a spatial frequency that is set on the basis of a border for recognizing a change in the shape when a person sees the first test object.

Figure 5:
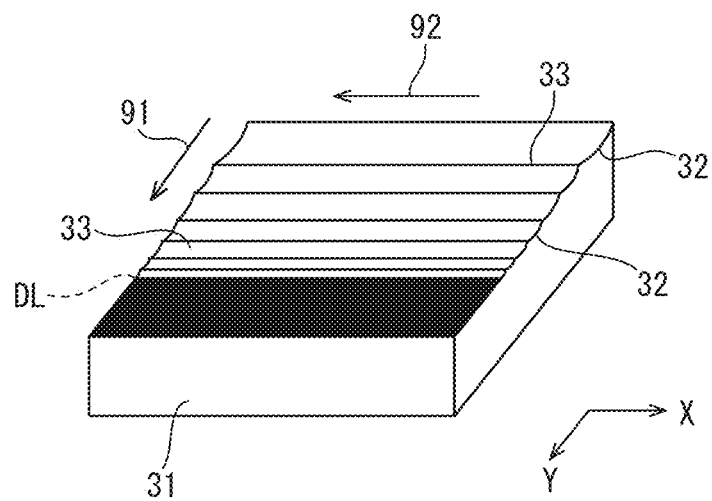
FIG. 5 is a perspective view of first test object according to the embodiment.

FIG. 5 shows a perspective view of the first test object for setting the determination value of the spatial frequency. The first test object 31 is formed in a rectangular parallelepiped shape. In the first test object 31, the surface is formed with a streak-like protrusions and recesses of which interval gradually decreases. Multiple recessed parts 32 are formed on the surface of the first test object 31 so as to extend in the X axis direction. The recessed part 32 has a cross sectional shape in an arc. The recessed parts 32 gradually become shallower toward the positive side in the Y axis direction as indicated by arrow 91.

A streak 33 is formed between recessed parts 32 adjacent to each other. The multiple streaks 33 extend in the X axis direction. The multiple streaks 33 are formed so as to be parallel to each other. The interval between streaks 33 gradually becomes narrower toward the positive side in the Y axis direction as indicated by arrow 91.

When the first test object 31 is formed, for example, a recessed part 32a is formed by moving a ball end mill in the direction indicated by arrow 92. The same ball end mill is used in order to form recessed parts 32. At this occasion, the depths of the recessed parts 32 gradually change. More specifically, the recessed parts 32 are formed by gradually changing the amount of pick feed when processing is performed with the ball end mill.

Figure 6:
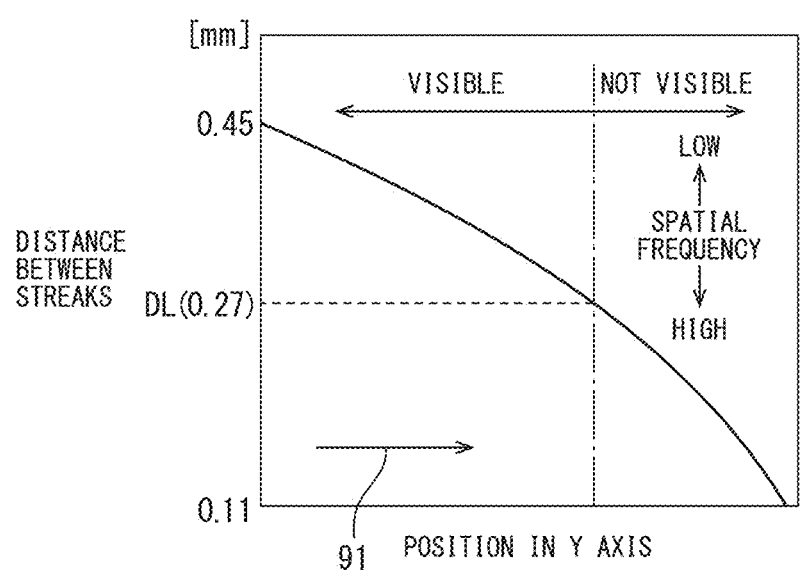
FIG. 6 is a graph illustrating the interval of streaks with respect to a position in the Y axis of the first test object.

FIG. 6 is a graph illustrating a relationship between the interval of streaks and the position in the Y axis of the first test object. It is understood that as the position in the Y axis increases, the interval of streak 33 is narrower. In this example, the intervals of streaks 33 change in a manner of quadratic function. The spatial frequency is a frequency with regard to the length. As represented in the following equation (4), the spatial frequency can be defined as a reciprocal number of the length.

[Formula 4]

$$f = \frac{1}{L} \quad (4)$$

f: spatial frequency

L: length

In the first test object 31, the reciprocal number of the distance between the streaks 33 can be defined as a spatial frequency. In the first test object 31, the spatial frequency increases toward the direction indicated by arrow 91.

With reference to FIG. 5 and FIG. 6, the first test object 31 is irradiated with light from various directions while the first test object 31 is covered with, for example, a white curtain, so that there is no reflection. Then, the observer observes the first test object 31 from immediately above the first test object 31. The observer can recognize multiple streaks 33 in an area where the distance between the streaks 33 is large. However, when the distance between the streaks 33 decreases, it is impossible for the observer to recognize multiple streaks 33. The point where the streaks 33 may not be recognized is a visual resolution by a person.

As described above, the first test object 31 has a shape of which visual resolution is to be evaluated. In the example illustrated in FIG. 5 and FIG. 6, the pick feed amount is varied exponentially from 0.45 mm to 0.11 mm. In general, the visual resolution is expressed as a viewing angle. The viewing angle depends on the size of the target object and the distance between the target object and the viewpoint. Therefore, the interval between the streaks 33 can be defined on the basis of the distance where the product to be evaluated is observed. In this case, for reference, a visual acuity 1.0 corresponds to a viewing angle of 1/60 degrees in the visual resolution.

In the present embodiment, the observer observes the first test object from a distance defined in advance. The observer specifies the position in the Y axis where the observer may not see the pattern of the streaks 33 on the surface. With a measuring instrument, the position of this point in the Y axis is measured. Then, the distance between the streaks 33 is determined on the basis of the position in the Y axis. The spatial frequency of the visibility limitation of the observer can be determined on the basis of the distance between the streaks 33. In the present embodiment, the spatial frequency of the visibility limitation is measured for each of multiple observers. Then, the average value of the spatial frequencies of the visibility limitations of multiple observers is calculated. This average value is set as the determination value of the spatial frequency.

Figure 7:
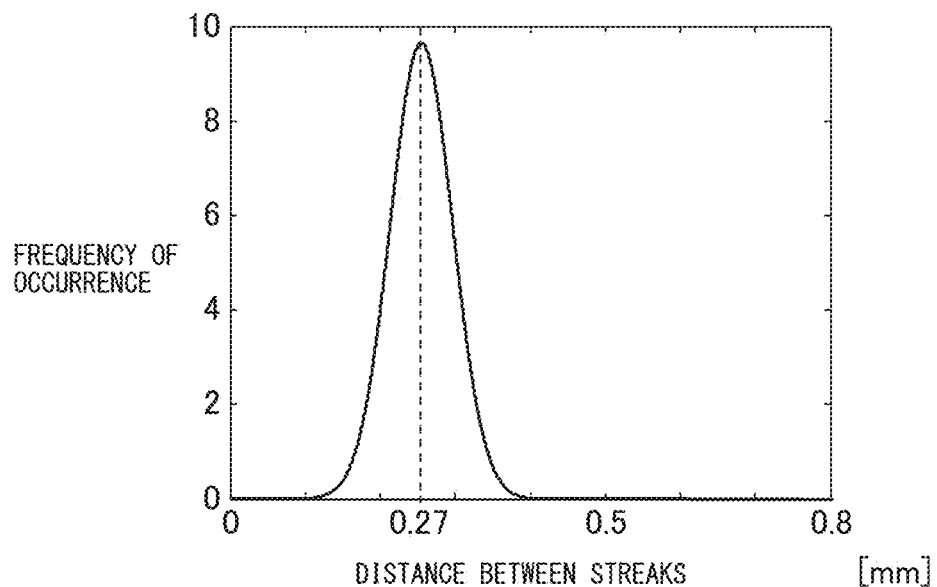
FIG. 7 is a graph illustrating the frequency of occurrence of observers with respect to a visibility limitation of an interval of streaks in the first test object.

FIG. 7 shows a graph of a result obtained by observing the first test object. The example as illustrated in FIG. 7 represents an evaluation result when the first test object 31 is observed from the distance of 25 cm with a brightness in an ordinary office. The visual resolution varies depending on the observer. In the example as illustrated in FIG. 7, the average of the visual resolution is 0.27 mm, and the viewing angle is 0.07 degrees. More specifically, when the distance between the streaks 33 is 0.27 mm, this can be determined that many people may not distinguish the pattern of the streaks 33. The spatial frequency of the visibility limitation at this occasion is 1/0.27 [1/mm], and this value is employed as the determination value of the spatial frequency.

In the present embodiment, the average value of multiple observers is adopted as the interval at which the pattern of streaks 33 disappear, but the embodiment is not limited to this, and the result of the observer can be processed statistically. For example, a margin may be taken into consideration, and interval obtained by adding a certain value to the average value of the measurement results of the observers may be employed.

The visual resolution can be quantitatively set by employing the first test object 31. The visual resolution can be set in accordance with the type of the person who observes the target object. The visual resolution is determined by the refractive index of the eyeball and the size of the photoreceptor cell of the retina of the person. For this reason, it is thought that large individual differences are unlikely to occur. However, for example, the best easy-to-see focal length is different between near-sighted and far-sighted persons, and therefore, the visual resolution may be different when the target object arranged at the same distance is seen.

Therefore, for example, a visual resolution that is set by the child observers can be used for children's products, and a visual resolution that is set by the elderly observers can be used for the product used by the elderly people. As described above, a type of persons who actually observes the target object as the observer is selected, and the visual resolution is set, whereby the surface quality of actual products can be improved.

The visual resolution depends on the distance from the target object. Therefore, when the measurement is performed with the observers, it is preferable to perform the measurement at a distance corresponding to a distance where the actual product is seen by a person.

The first test object is not limited to this aspect, but any test object for setting the visual resolution can be employed. For example, the interval between streaks may be linearly changed in the Y axis direction. In the above first test object, the pattern of streaks are linearly formed in the plan view, but the embodiment is not limited to this, and the pattern of streaks are formed in curves in the plan view.

The first test object according to the present embodiment is formed with the ball end mill. When the tool diameter of the ball end mill is changed, the sectional shape of the recessed part changes. The inventors made multiple first test objects using multiple ball end mills with different tool diameters. During the period of making one first test object, the inventors used the same ball end mill without changing the ball end mill. As a result, it is understood that, even if the tool diameter of the ball end mill is different, the visual resolution of the observer is almost constant.

As illustrated in FIG. 1, based on the spatial frequency of the visibility limitation obtained as described above, the spatial frequency processing part 16 removes the spatial frequency component exceeding the visibility limitation from the error in the normal direction change rate. An example of a method for removing the component of the spatial frequency exceeding the visibility limitation includes using a publicly known filter such as low pass filter. Alternatively, the error in the normal direction change rate is transformed with Fourier transform, and the frequency component larger than the visibility limitation is removed from the result obtained through Fourier transform. Thereafter, the error in the normal direction change rate from which the component of the spatial frequency that may not be seen is removed can be obtained with inverse Fourier transform.

Alternatively, with respect to FIG. 3, a desired high frequency component can be removed by calculating the average value of the errors in the normal direction change rates while using multiple setting points before and after each of the setting points 41b. The average value of the errors in the normal direction change rates at the setting points before and after the i-th setting point is adopted as the error in the normal direction change rate at the i-th setting point from which the high frequency component has been removed. The error in the normal direction change rate from which the high frequency component has been removed can be expressed by the following equation (5).

[Formula 5]

$$E_{ivis} = \frac{E_{i-\frac{N}{2}} + E_{i-(\frac{N}{2}-1)} + \ldots + E_{i-1} + E_{i+1} + \ldots + E_{i+(\frac{N}{2}-1)} + E_{i+\frac{N}{2}}}{N} \quad (5)$$

$E_i$: Error in the normal direction change rate at the i-th setting point

N: The number of (even number of) setting points for calculating average value $E_{ivis}$: Error in the normal direction change rate from which high frequency component has been removed In this case, the number N of setting points for calculating the average value $E_{ivis}$ can be calculated on the basis of the distance between setting points and the spatial frequency of the visibility limitation. The number N of setting points for calculating the average value $E_{ivis}$ can be calculated according to the following equation (6).

[Formula 6]

$$N = \frac{1}{f \cdot \Delta x} \quad (6)$$

f: Spatial frequency of visibility limitation
Δx: Distance between setting points
N: The number of setting points As described above, the high frequency components beyond the visibility limitation can also be removed by calculating the moving average value of the errors in the normal direction change rates. Errors related to fine protrusions and recesses which may not be recognized by a person can be eliminated.

By the way, it is known that vision recognizes the contrast of the surface of the target object, i.e., the change in brightness. The brightness of the surface of the target object is determined by the relationship between the orientation of the surface, the light source, and the position of the viewpoint. The change of the brightness of the surface of the target object depends on the change in the normal direction of the surface. When the change in the normal direction is high, the change of the brightness of the surface of the target object is also great. Therefore, the contrast that the person can visually recognize, i.e., the change rate of the brightness, can be evaluated upon being replaced with the normal direction change rate. By quantifying the visibility limitation of the normal direction change rate of the surface of the target object, an evaluation can be performed to determine whether or not there is a visual problem on the surface.

With reference to FIG. 1 and FIG. 2, in step 84, the error determination part 17 performs a step of determining whether or not the visible error in the normal direction change rate is present on the basis of the second visual characteristic data. When the error in the normal direction change rate is greater than the determination value, a person recognizes that the evaluation target shape is different from the design shape. In other words, a person can determine that the evaluation target shape includes a part that is recognized as being different from the design shape.

The second visual characteristic data is data relating to the magnitude of the error in the normal direction change rate. In the present embodiment, the second visual characteristic data includes a determination value of the error in the normal direction change rate that is set on the basis of a border at which a person can recognize the change in the shape when the person sees the second test object. The second test object has, on the surface, a shape for which the visibility limitation of normal direction change rate is evaluated.

Figure 8:
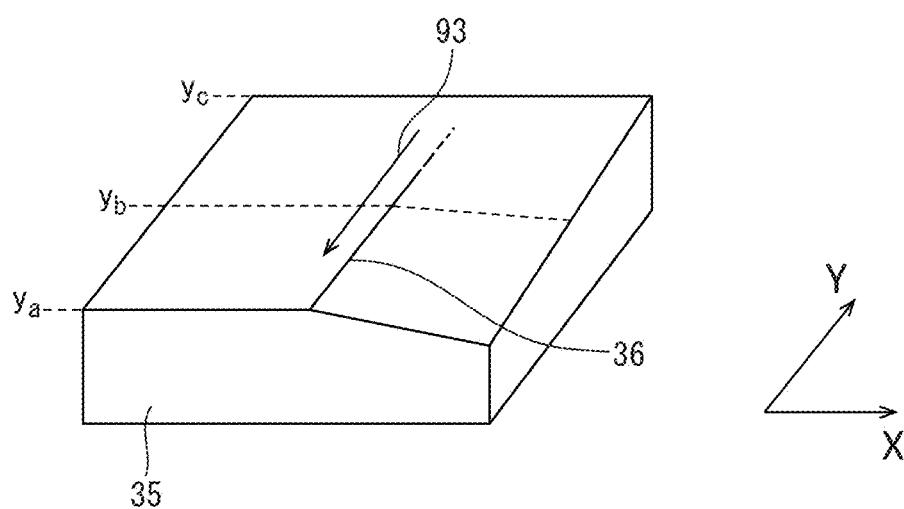
FIG. 8 is a perspective view of second test object according to the embodiment.

FIG. 8 shows a perspective view of the second test object for setting the second visual characteristic data. The second test object 35 is formed in a rectangular parallelepiped shape. The second test object 35 has a shape in which two planes intersect with each other. The second test object 35 has a ridgeline 36 extending in the Y axis direction that is formed when the two planes intersect with each other. In the ridgeline 36, the direction in which the plane extends changes. The second test object 35 has such shape that the normal direction change rate of the ridgeline 36 continuously varies along the direction in which the ridgeline 36 extends.

Figure 9:
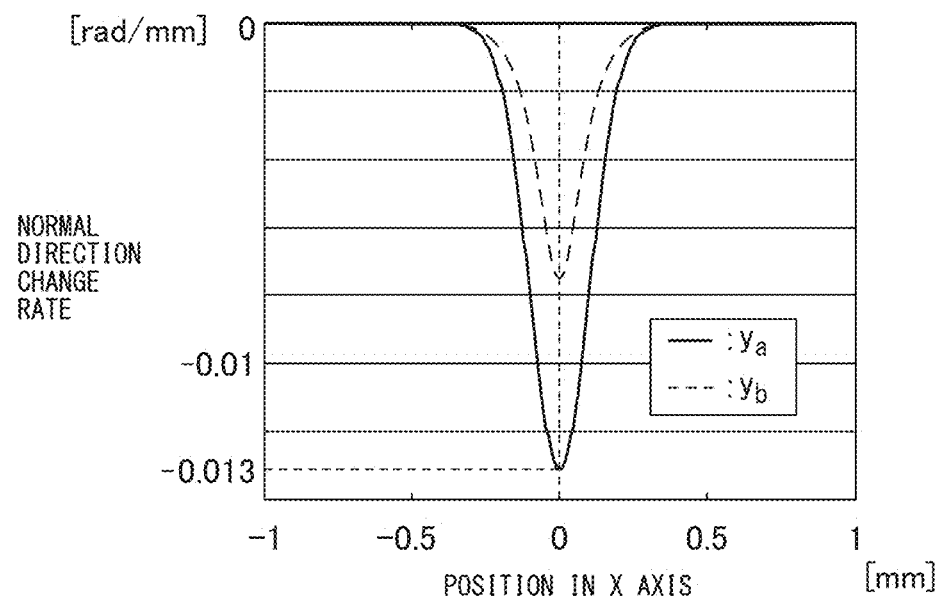
FIG. 9 is a graph illustrating a relationship between a position in the X axis of the second test object and a normal direction change rate.

FIG. 9 shows a graph of the normal direction change rate with respect to the position in the X axis near the ridgeline. The position of the top line of the ridgeline 36 in the X axis is zero. FIG. 9 illustrates a graph passing through positions $y_a$, $y_b$ in the Y axis direction of the second test object 35. For the second test object 35, the cycle of the shape change is approximately 0.5 mm. With reference to FIG. 8 and FIG. 9, the normal direction change rate increases as advanced toward the direction indicated by the arrow 93. The position $y_a$ in the Y axis is a position at one of the end faces of the second test object 35, and the magnitude of the normal direction change rate is the highest at position $y_a$. At the position $y_b$ at the center of the second test object 35, the normal direction change rate is smaller than that at the position $y_a$. The position $y_c$ in the Y axis is a position at the other of the end faces of the second test object 35, and the normal direction change rate is zero at the position $y_c$. As described above, one of the planes is formed such that the inclination of the plane gradually increases as advanced toward the direction indicated by the arrow 93. In the present embodiment, the normal direction change rate is changed from 0 [rad/mm] to −0.013 [rad/mm] in an exponential manner. The state of the change of the normal direction change rate is not limited to this aspect, and, for example, the normal direction change rate may be changed linearly.

When the observer observes the second test object 35, the observer can visually recognize the ridgeline 36 in a portion where the normal direction change rate is high. On the other hand, the observer may not visually recognize the ridgeline 36 in a portion where the normal direction change rate is low. The limitation where the observer can see the ridgeline 36 can be defined as the visibility limitation of the normal direction change rate.

The observer specifies the point where ridgeline 36 may not be seen. With a measuring instrument, the position of this point in the Y axis is measured. Then, the visibility limitation of the normal direction change rate can be set based on the position in the Y axis. In the present embodiment, for the second test object 35, multiple observers observe the second test object 35. Then, the average value of the visibility limitations of the normal direction change rates observed by multiple observers is employed as the determination value.

Figure 10:
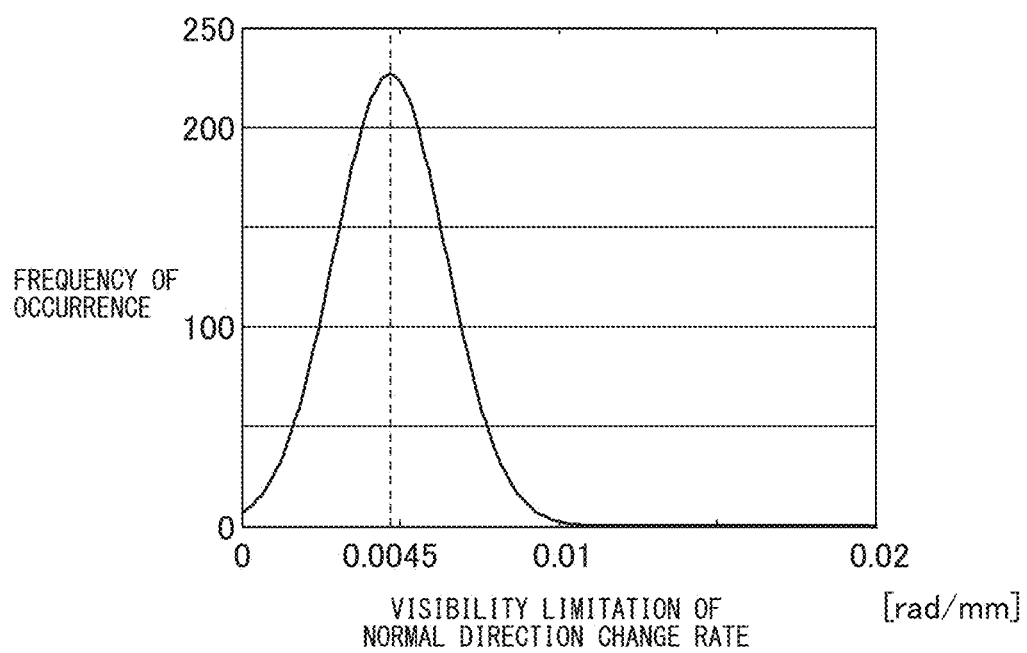
FIG. 10 is a graph illustrating the frequency of occurrence of observers with respect to a visibility limitation of the normal direction change rate in the second test object.

FIG. 10 shows a graph of the frequency of occurrence with respect to a visibility limitation of a normal direction change rate when multiple observers see the second target object. The example as illustrated in FIG. 10 represents a case when the second test object 35 is observed from the distance of 25 cm with brightness in an ordinary office. The visibility limitation of the normal direction change rate involves some variation depending on observers. In the average value of the observes, the normal direction change rate is 0.0045[rad/mm]. In other words, when the normal direction change rate is 0.0045 [rad/mm], a lot of people may not recognize the ridgeline 36. In the present embodiment, this value is set as the determination value of the error in the normal direction change rate. The method for setting the determination value of the error in the normal direction change rate is not limited to this aspect, and the determination value may be calculated statistically on the basis of the evaluation result of the observers.

Figure 11:
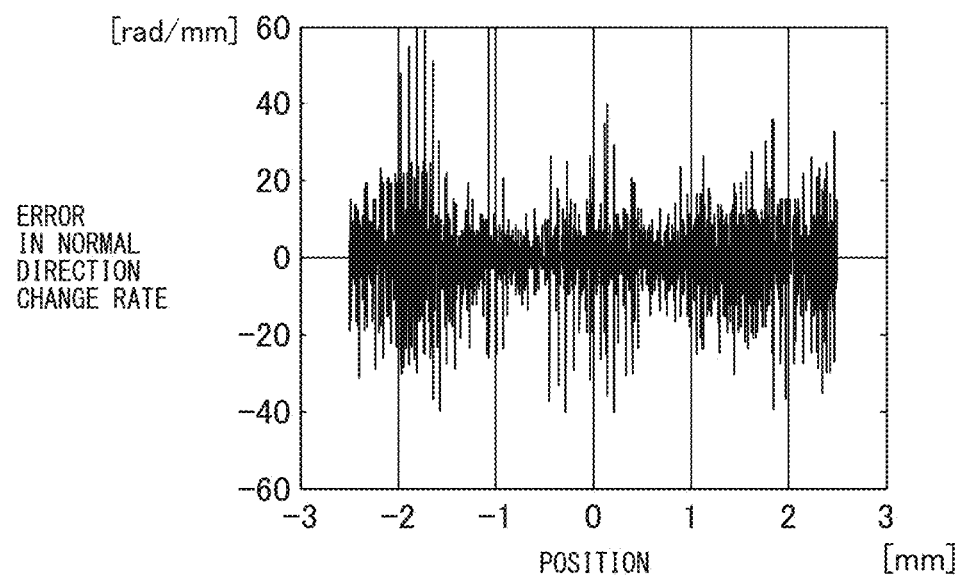
FIG. 11 is a graph illustrating a relationship between the position of the evaluation target shape and an error in the normal direction change rate.

FIG. 11 shows a graph of the error in the normal direction change rate calculated by the shape error calculation part. The horizontal axis is the position in the X axis, and a certain position is set as zero. It is understood that the error in the normal direction change rate greatly changes at each position. In other words, the error in the normal direction change rate includes a high frequency component.

Figure 12:
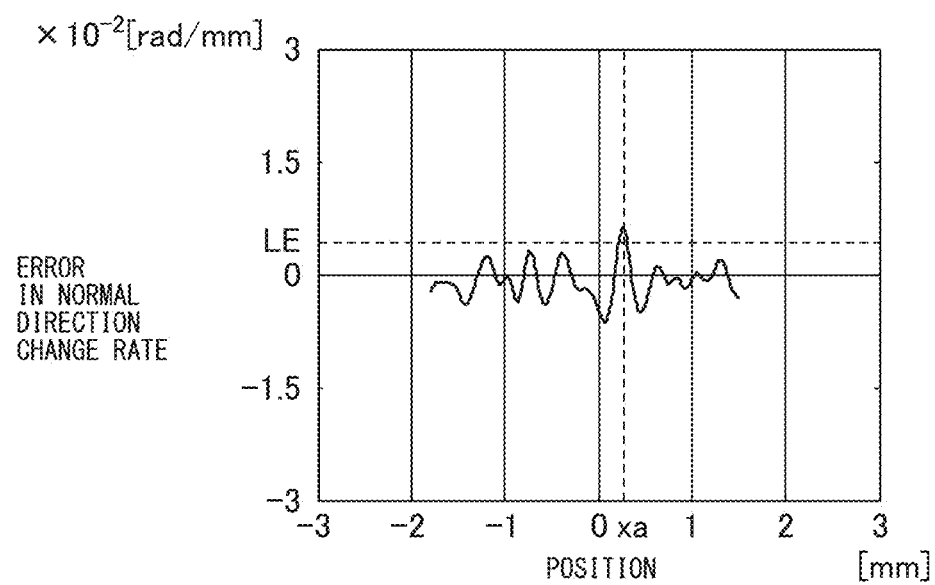
FIG. 12 is a graph illustrating a relationship between the position of the evaluation target shape and the error in the normal direction change rate after the high frequency component is removed.

FIG. 12 shows a graph of the error in the normal direction change rate from which the high frequency component is removed by the spatial frequency processing part. The graph is smoother and the high frequency component at each position has been removed in comparison to the graph of FIG. 11. FIG. 12 describes a determination value LE of the error in the normal direction change rate.

As described above, when the error in the normal direction change rate of the target object is larger than the human-visible normal direction change rate, a person can recognize that the evaluation target shape is different from the design shape. For this reason, the visibility limitation of the normal direction change rate obtained with the second test object 35 can be used as the determination value LE of the shape error. In the example as illustrated in FIG. 12, the determination value LE of the error in the normal direction change rate is 0.0045 [rad/mm] (see FIG. 10).

The part exceeding the determination value LE is a part that a person recognizes that the evaluation target shape differs from the design shape. For example, at the position $x_a$, a person can judge that the evaluation target shape differs from the design shape.

With reference to FIG. 1 and FIG. 2, in step 84, the error determination part 17 determines whether or not the error in the normal direction change rate is more than the determination value. When the error in the normal direction change rate is equal to or less than the determination value in all the area in step 84, the process proceeds to step 86. In step 86, the display part displays that there is no visible shape error. When the error in the normal direction change rate is more than the determination value in at least a part of the area in step 84, the process proceeds to step 85.

In step 85, the position identifying part 18 identifies the position of the target object where the error in the normal direction change rate is more than the determination value. In the example illustrated in FIG. 12, the position $x_a$ is identified. It can be determined that, at the position $x_a$, a visual problem occurs with the shape. Subsequently, the process proceeds to step 86. In step 86, the display part displays that there is a visible shape error. The display part displays the position where visible shape error occurs.

The second visual characteristic data is preferably made on the basis of the user stratum who mainly use the actual products and the usage environment in the same way as the first visual characteristic data. These visual characteristic data can be made according to the type of a person who uses the product such as visual acuity and age.

The method for setting the determination value of the error in the normal direction change rate and the evaluation method during the evaluation can be set on the basis of the visual characteristic desired for the evaluation target shape, the usage state of actual products, and the like. For example, in the above embodiment, the average value of the measurement results of multiple observers is adopted as the determination value, but the embodiment is not limited to this, and a determination value including a margin for the average value may be used.

In the above embodiment, the position where the error in the normal direction change rate is more than the determination value is detected, but the embodiment is not limited to this, and, for example, the average value of the errors in the normal direction change rates in a section of several mm may be calculated, and when this average value is more than any other position, it may be determined that the problem is visible to people. Alternatively, when this average value is more than a determination value defined in advance, it may be determined that the problem is visible to people. Still alternatively, with regard to the error in the normal direction change rate, a contrast sensitivity curve including spatial frequency property of vision of a person may be used so as to determine that the problem is visible to people. After the error in the normal direction change rate is weighted with the spatial frequency, it may be determined as to whether or not the error in the normal direction change rate is more than a determination value, and when the error in the normal direction change rate is more than the determination value, it may be determined that the problem is visible to people.

In the above embodiment, the visibility limitation of normal direction change rate when the observer sees the second test object 35 is defined. By adopting this method, the visibility limitation of the normal direction change rate can be quantitatively determined. In addition, the second test object is made to have the same color, material, or surface roughness as the actual product, whereby the surface quality as seen by a person can be more accurately determined. Further, the same surface processing as the product is applied, whereby the surface quality can be more accurately determined. According to these methods, the effect caused by difference in the color and texture of the surface of the target object can also be taken into consideration.

The determination of the visibility limitation of the normal direction change rate is not limited to the method in which the observer actually sees the second test object. Alternatively, the visibility limitation of the normal direction change rate may be set by allowing the observer to see a picture of the second test object or a display device displaying an image obtained by photographing the second object with a camera.

In the above embodiment, the error in the normal direction change rate is determined after removing the high frequency component of the spatial frequency, but the step of removing the high frequency component of spatial frequency may not be performed. For example, when data calculated by a computer such as a simulator is used as evaluation target data, the high frequency component may not be expressed in some cases. In such a case, the step of removing the high frequency component of the spatial frequency may not be performed.

The shape evaluation method and the shape evaluation device according to the present embodiment can evaluate the quality of the surface of the target object that people feel visually. In addition, it can be determined whether a brightness change is caused by a shape change intentionally provided in design or a brightness change is caused by a shape error such as manufacturing error. Even if there is no actually produced product, the occurrence of visual problem can be evaluated. For example, as described later, it can be determined whether or not a visual problem occurs in the target object by using a result of processing simulation instead of a measurement result of a shape on a surface of a target object actually processed.

In addition, the shape evaluation method and the shape evaluation device according to the present embodiment can separately evaluate the visual resolution based on the spatial frequency and the visibility limitation of the contrast.

The visual characteristic data according to the present embodiment includes the first visual characteristic data and the second visual characteristic data. The evaluation accuracy of the surface quality can be improved by making the visual identification data on the basis of the result obtained when a person observes a test object. When the visual characteristic data is made on the basis of actual vision of a person, the evaluation according to the present invention can be matched well with the evaluation based on actual vision. For example, it can be determined whether or not a shape change is intentionally provided with a high degree of accuracy.

In the above embodiment, the error in the normal direction change rate is calculated using the normal direction data calculated from two-dimensional coordinate data, but the embodiment is not limited to this, and three-dimensional normal direction data may be used. In other words, in the above embodiment, the design data and the evaluation target data include two-dimensional coordinate information, but the embodiment is not limited to this, and three-dimensional coordinate information may be included. The three-dimensional normal direction change rate can be expressed by the following equation (7) and equation (8).

[Formula 7]

$$\frac{\partial \theta_{xi}}{\partial x} = \left(\frac{\theta_{x(i+1),j} - \theta_{xi,j}}{x_{(i+1)} - x_i}\right) \quad (7)$$

$$\frac{\partial \theta_{yi}}{\partial y} = \left(\frac{\theta_{yi(j+1)} - \theta_{yi,j}}{y_{(j+1)} - y_j}\right) \quad (8)$$

The design data and the evaluation target data may be not only data including a coordinate value and data including a normal direction but also STL (Standard Triangulated Language) data that can be used by CAD devices and the like.

In the present embodiment, the error in the normal direction change rate is calculated as a shape error, but the embodiment is not limited to this, and the shape error calculation part can calculate any shape error in an evaluation target shape with respect to a design shape. For example, with reference to FIG. 3, an error in an angle of the normal direction may be used as a shape error. The error in the angle of the normal direction can be calculated by the following equation (9).

[Formula 8]

$$e_\theta = \theta_{ir} - \theta_i \quad (9)$$

$e_\theta$: error in angle of normal direction

With reference to FIG. 1, in the present embodiment, the design data and the evaluation target data are stored in the data storage part, but the embodiment is not limited to this, and a normal direction change rate calculated on the basis of the design data and the evaluation target data may be stored in the data storage part. In this case, the change rate calculation part is provided before the data storage part. The error in the normal direction change rate may be stored in the data storage part. In this case, the shape error calculation part may be arranged before the data storage part. Any of these cases is mathematically equivalent.

Figure 13:
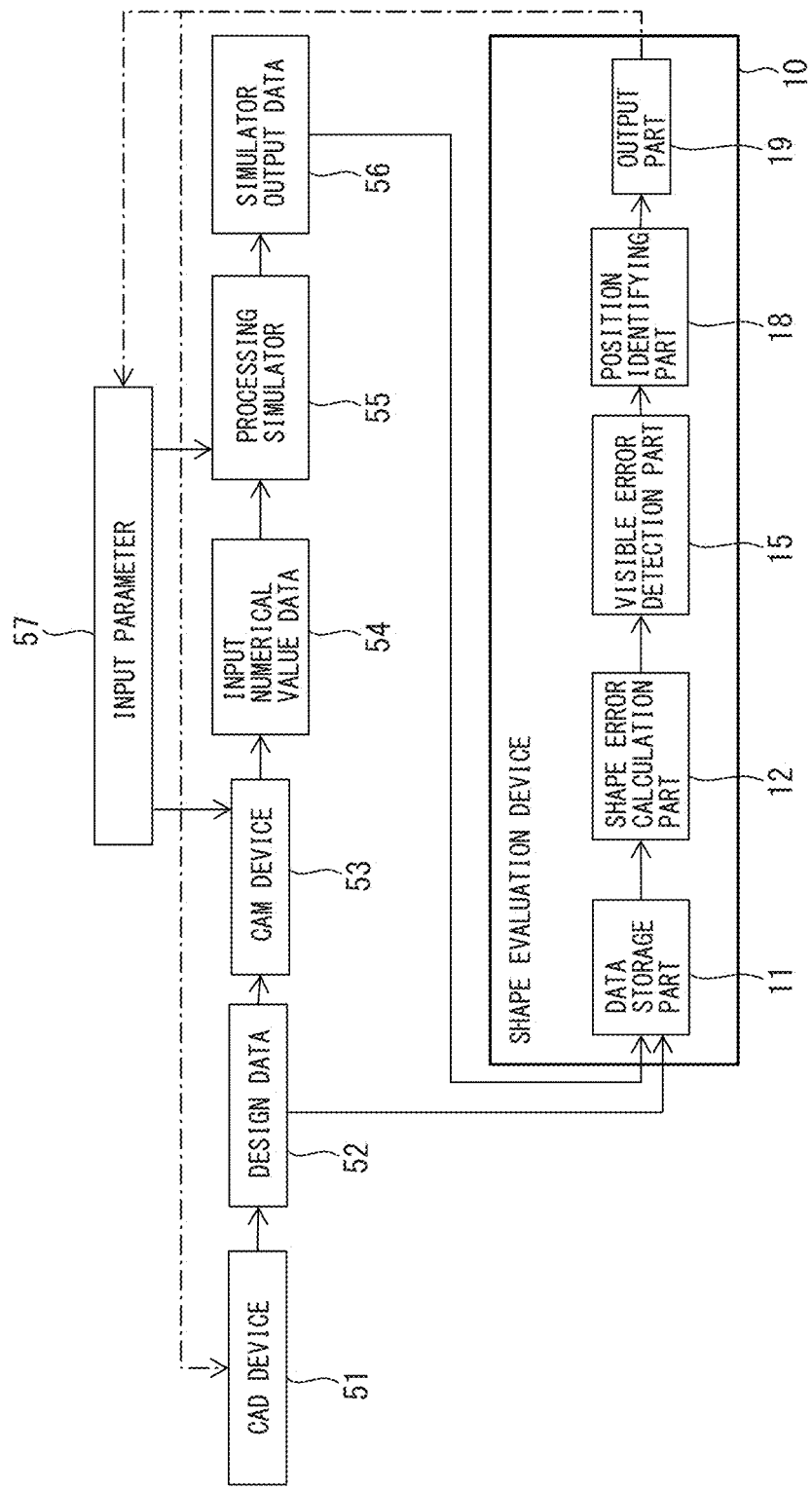
FIG. 13 is a block diagram of first processing system according to the embodiment.

FIG. 13 shows a block diagram of first processing system according to the present embodiment. The first processing system is provided with the shape evaluation device 10 explained above. In the first processing system, the shape of the workpiece is designed with a CAD (Computer Aided Design) device 51. The CAD device 51 provides design data 52 of the workpiece to a CAM (Computer Aided Manufacturing) device 53. The design data 52 of the workpiece is input into the shape evaluation device 10.

The CAM device 53 generates an input numerical value data 54 for driving a numerically controlled machine tool based on the design data 52. The input numerical value data 54 includes information about a path of the tool relative to the workpiece. An input parameter 57 such as a tool condition and a processing condition is input to the CAM device 53. The tool condition includes a tool type, a tool diameter, an optimum cutting speed, and the like. The processing condition includes a pick feed amount, a feed speed, a rotation speed of the main shaft, and the like.

The first processing system includes a processing simulator 55. The processing simulator 55 simulates the processing of the machine tool with a computer based on the input numerical value data 54 and the input parameter 57. The input parameter 57 that is input into the processing simulator 55 includes a control parameter of the simulated machine tool and the like. The processing simulator 55 outputs a simulator output data 56 including information about the shape of the processed workpiece. The simulator output data 56 includes information about a coordinate value of the processed workpiece, information about normal direction, and the like. In the first processing system, the simulator output data 56 corresponds to the evaluation target data. The simulator output data 56 is input to the shape evaluation device 10.

The shape evaluation device 10 determines whether or not visible shape error is included in the shape of the processed workpiece based on the design data 52 and the simulator output data 56. When visible shape error is included, the worker can change the design of workpiece with the CAD device 51 on the basis of the evaluation result that is output by the output part 19. Alternatively, the worker can change the input parameter 57 so that the shape of the processed workpiece does not include a visible shape error.

As described above, when a track of a tool corresponds to the shape of the surface in processing such as cutting with a numerically controlled machine tool, evaluation target data can be generated with a mathematical model simulating movement of a tool.

In the first processing system, the processed shape can be evaluated without performing any actual processing. Alternatively, before performing actual processing, the design shape can be changed and the input parameter can be changed so that any visible shape error is not included in the shaped of the processed workpiece.

Figure 14:
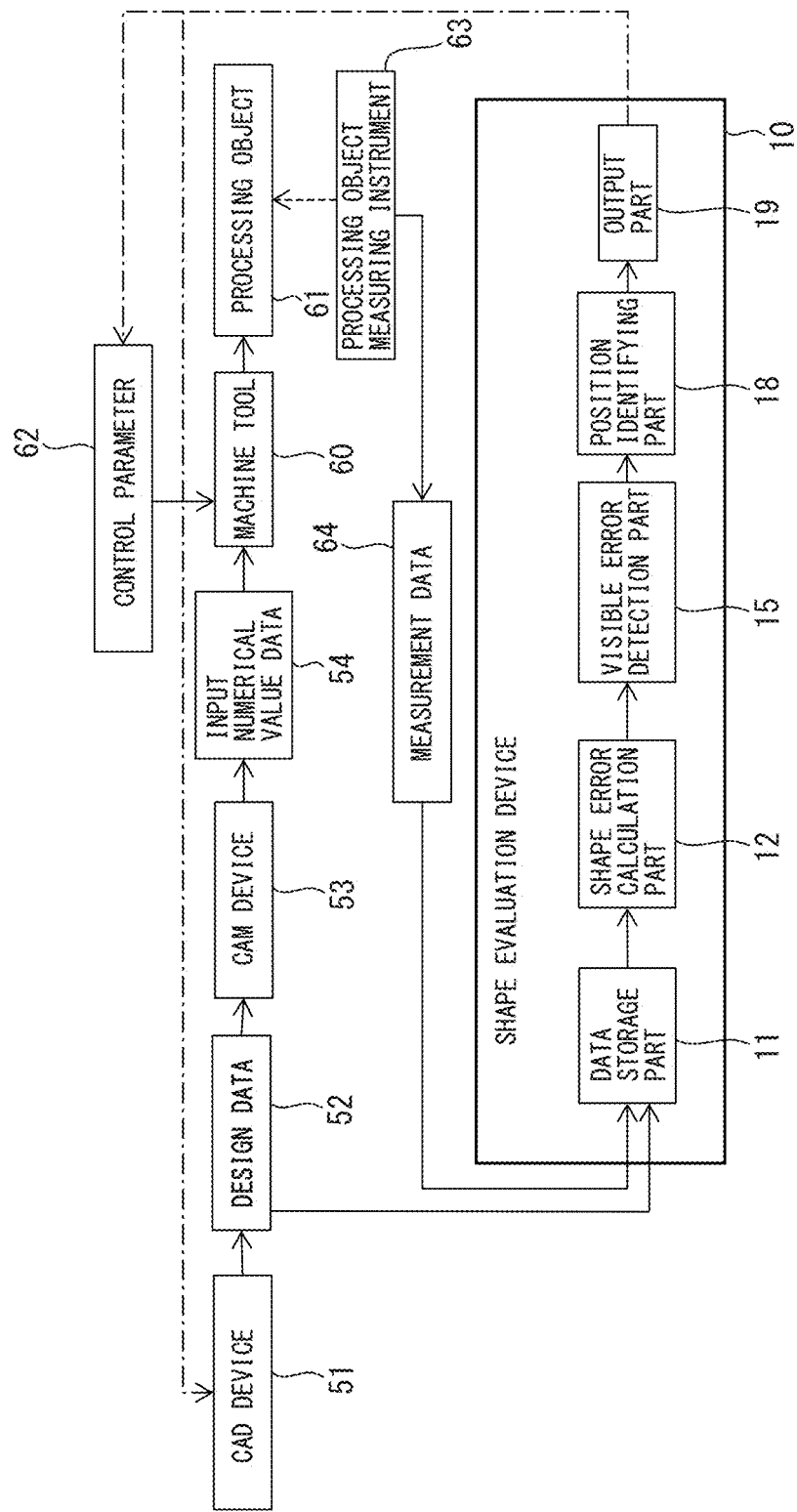
FIG. 14 is a block diagram of second processing system according the an embodiment.

FIG. 14 shows a block diagram of second processing system according to the present embodiment. The second processing system is different from the first processing system in that a numerically controlled machine tool 60 and a processing object measuring instrument 63 measuring the surface shape of the processing object (workpiece) processed with the machine tool 60 are provided. The input numerical value data 54 that is output by the CAM device 53 is input into the machine tool 60. The control parameter 62 is input into the machine tool 60. The control parameter 62 includes a time constant for acceleration and deceleration, backlash compensation, gain in the feedback control of the feed axis, and the like. The machine tool 60 can automatically process workpiece based on control parameter 62 and input numerical value data 54. The machine tool 60 forms a processing object 61.

The processing object measuring instrument 63 measures the surface shape of the processing object 61. Examples of the processing object measuring instrument 63 include a roughness measurement device and a three-dimensional measurement device. Then, the processing object measuring instrument 63 generates measurement data 64 on the basis of the measurement result of the shape on the surface of the processing object 61. The measurement data 64 includes information about a coordinate value, information about a normal direction, and the like. The measurement data 64 corresponds to the evaluation target data. The measurement data 64 is input into the shape evaluation device 10.

The shape evaluation device 10 determines whether or not a visible shape error is included in the shape of the processing object 61 after machining based on the design data 52 and the measurement data 64. When a visible shape error is included, the worker can change the design of workpiece in CAD device 51 on the basis of the evaluation result that is output by the output part 19. Alternatively, the worker can change the control parameter 62 so that the shape of the processing object does not include any visible shape error.

As described above, the surface shape can also be evaluated quantitatively even when the evaluation target shape is the shape of the actual processing object. In addition, since the evaluation result is quantitatively indicated, it is easy to change the design of the workpiece and the control parameter 62.

Alternatively, the movement track of the tool and the workpiece when the machine tool is driven can be measured while the workpiece is not arranged. The evaluation target data may be made on the basis of the measurement result of movement track. For example, the movement track of the table where the tool or the workpiece is arranged can be measured by a true circle measuring instrument including a ball bar, a grid encoder, a displacement meter, an accelerometer, or the like. The evaluation target data can be generated based on these measurement results. Alternatively, it may be possible to use information about the feedback control implemented in the control device of the machine tool and the like.

With this method, it is possible to drive the machine tool so as to perform actual processing. Alternatively, the measurement can be performed with a basic operation of a certain machine tool. The operation of the machine tool in actual processing may be estimated based on the measurement result of the basic operation, and the evaluation target data may be made on the basis of the estimated motion. Even in this method, it is possible to evaluate the surface shape of the processed workpiece without processing any actual workpiece.

The shape evaluation method and the shape evaluation device according to the present invention can be used for evaluation of a shape of a product which is to be evaluated through vision of a person. In addition, the shape evaluation method and the shape evaluation device can be used so as to set a shape tolerance during designing and determine a method for solving a problem when the visual problem occurs.

In each of the above-mentioned controls, the order of steps can be appropriately changed as long as the function and the action are not changed. The above embodiments can be appropriately combined. In each of the above figures, the same or equivalent parts are denoted with the same reference numerals. The above embodiments are illustrative and do not limit the invention. In the embodiment, changes in the embodiment described in the claims are included.

REFERENCE SIGNS LIST 10 shape evaluation device
11 data storage part
12 shape error calculation part
13 change rate calculation part
14 change rate error calculation part
15 visible error detection part
16 spatial frequency processing part
17 error determination part
18 position identifying part
19 output part
25 design data
26 evaluation target data
31 first test object
33 streak
35 second test object
36 ridgeline
40 target object
52 design data

The invention claimed is:

1. A shape evaluation method for evaluating a shape on a surface of a target object, the shape evaluation method comprising:
   a step of storing design data to which a design shape configured during designing of a target object is set;
   a step of storing evaluation target data to which an evaluation target shape which is a target of evaluation of the target object is set;
   a shape error calculation step of calculating a shape error on the basis of the design shape and the evaluation target shape;
   a visible error detection step of detecting a visible shape error from the calculated shape error on the basis of the shape error calculated in the shape error calculation step and visual characteristic data defined in advance; and
   a step of identifying a position where a visible shape error occurs,
   wherein the shape error calculation step includes a step of calculating an error in a normal direction change rate serving as the shape error by subtracting the normal direction change rate of the design shape from the normal direction change rate of the evaluation target shape,
   the visual characteristic data includes first visual characteristic data relating to a spatial frequency and second visual characteristic data relating to a magnitude of an error in the normal direction change rate, and
   the visible error detection step includes a step of removing a component of the spatial frequency that is seen from the error in the normal direction change rate on the basis of the first visual characteristic data, and a step of determining whether or not there is any error in the normal direction change rate that is seen on the basis of the second visual characteristic data.

2. The shape evaluation method according to claim 1, wherein;
   the first visual characteristic data includes a determination value of the spatial frequency that is set on the basis of a border where a change in a shape is recognized when a person sees first test object having the shape of which visual resolution is to be evaluated on a surface, and
   the second visual characteristic data includes a determination value of the error in the normal direction change rate that is set on the basis of a border where a change in a shape is recognized when a person sees second test object having the shape of which visibility limitation of the normal direction change rate is to be evaluated on a surface.

3. The shape evaluation method according to claim 2, wherein;
   the first test object has the shape of the surface including protrusions and recesses in a form of streaks of which interval gradually decreases, and
   the second test object has a ridgeline of which normal direction changes on the surface, and has such the shape that the normal direction change rate continuously changes at the ridgeline along a direction in which the ridgeline extends.

4. A shape evaluation device for evaluating a shape on a surface of a target object, the shape evaluation device comprising:
- a design data storage part for storing design data in which a design shape configured during designing of the target object is set;
- an evaluation target data storage part for storing evaluation target data in which an evaluation target shape being a target of evaluation of the target object is set;
- a shape error calculation part for calculating a shape error on the basis of the design shape and the evaluation target shape;
- a visible error detection part for detecting a visible shape error from calculated shape error on the basis of the shape error calculated by the shape error calculation part and visual characteristic data defined in advance; and
- a position identifying part for identifying a position where the visible shape error occurs, wherein the visual characteristic data includes first visual characteristic data relating to a spatial frequency and second visual characteristic data relating to a magnitude of a shape error, the shape error calculation part is formed to calculate an error in a change rate of the shape, and the visible error detection part includes a spatial frequency processing part for removing a component of the spatial frequency that is not seen from the error in the change rate of the shape on the basis of the first visual characteristic data and an error determination part for determining whether or not there is any error in the change rate of the shape that is seen on the basis of the second visual characteristic data.

* * * * *